United States Patent

Oberg

[11] Patent Number: 5,940,551
[45] Date of Patent: Aug. 17, 1999

[54] OPTICAL NXN WAVELENGTH CROSSCONNECT

[75] Inventor: Magnus G. Oberg, Hägersten, Sweden

[73] Assignee: Telefonaktiebolaget LM Ericsson, Stockholm, Sweden

[21] Appl. No.: 08/809,930

[22] PCT Filed: Sep. 26, 1995

[86] PCT No.: PCT/SE95/01095

§ 371 Date: Apr. 3, 1997

§ 102(e) Date: Apr. 3, 1997

[87] PCT Pub. No.: WO96/11537

PCT Pub. Date: Apr. 18, 1996

[30] Foreign Application Priority Data

Oct. 11, 1994 [SE] Sweden ................................ 9403446

[51] Int. Cl.$^6$ .............................. G02B 6/26; H04J 14/02
[52] U.S. Cl. ............................ 385/17; 385/18; 385/20; 385/24; 385/37; 359/130
[58] Field of Search ........................... 385/17–18, 20–24, 385/37, 46, 47; 359/124, 130, 152, 337, 341; 370/430, 497

[56] References Cited

U.S. PATENT DOCUMENTS

| | | | |
|---|---|---|---|
| 4,441,181 | 4/1984 | Winzer et al. | 370/497 |
| 4,821,255 | 4/1989 | Kobrinski | 359/152 |
| 5,040,169 | 8/1991 | Guerin et al. | 359/124 |
| 5,043,975 | 8/1991 | McMahon | 359/130 |
| 5,283,686 | 2/1994 | Huber | 359/337 |
| 5,608,825 | 3/1997 | Ip | 385/24 |
| 5,706,375 | 1/1998 | Mihailov et al. | 385/24 |
| 5,726,785 | 3/1998 | Chawki et al. | 359/130 |
| 5,748,349 | 5/1998 | Mizrahi | 385/37 |

FOREIGN PATENT DOCUMENTS

| | | |
|---|---|---|
| 0 638 837 | 2/1995 | European Pat. Off. . |
| WO 97/06614 | 2/1997 | WIPO . |

OTHER PUBLICATIONS

"Wavelength Conversion Laser Diodes Application to Wavelength–Division Photonic Cross–Connect Node with Multistage Configuration", IEICE Trans. Commun., vol. E–75–B, No. 4, Apr. 1992, Hiroyuki Rokugawa, et al.

"Low–Loss Architecture for Wavelength Division Multiple Access Networks", IBM Technical Disclosure Bulletin, vol. 32, No. 4B, Sep. 1989, IBM Corp.

*Primary Examiner*—Hemang Sanghavi
*Attorney, Agent, or Firm*—Burns, Doane, Swecker & Mathis, L.L.P.

[57] ABSTRACT

Optical coupling systems that include optical NxN wavelength cross-connectors, where N is the number of inputs and outputs. The wavelength cross-connectors are used to connect together different nodes in the coupling system and are comprised of two different passive components: optical circulators and fiber gratings. A 2x2 wavelength cross-connector is formed by two circulators that are connected together through the medium of a fiber grating connected to the intermediate ports of the circulators. To construct a 4x4 wavelength cross-connector, two 2x2 wavelength cross-connectors are used, wherein the outputs of the 2x2 wavelength cross-connectors are connected together in pairs by means of circulator-pairs and a fiber grating. The fiber gratings reflect certain of the wavelength channels in the input signals delivered to the inputs and transmit remaining wavelength channels, thereby enabling each node to communicate with each other node. This enables wavelength cross-connectors having N inputs and N outputs to be built-up.

24 Claims, 6 Drawing Sheets

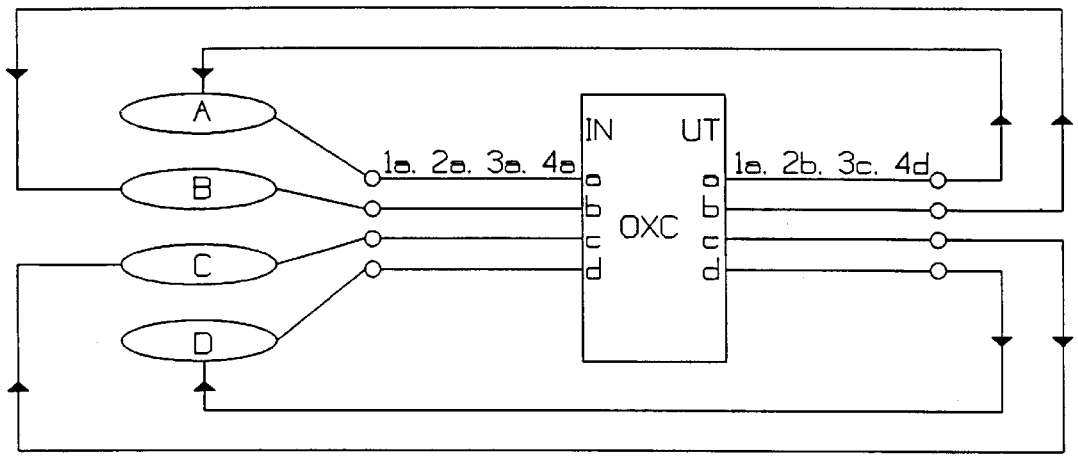
Fig 1a
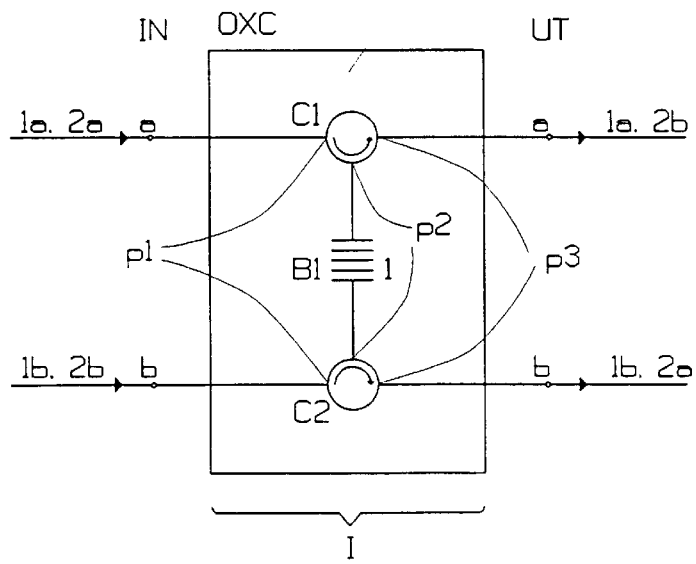
Fig 1b
Fig 2a
Fig 2b

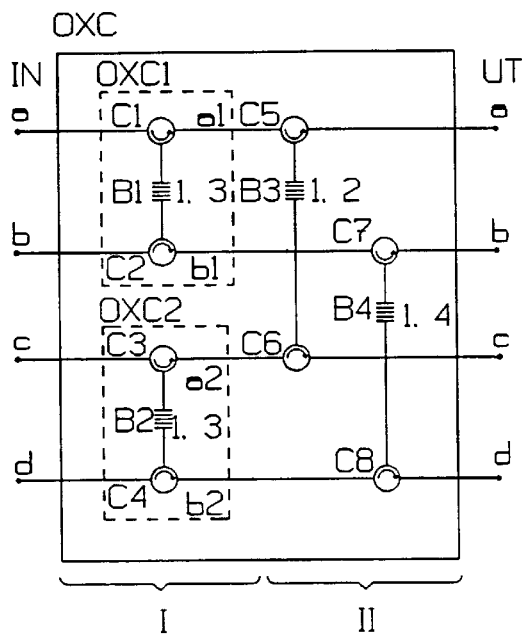
Fig 3a
Fig 3b
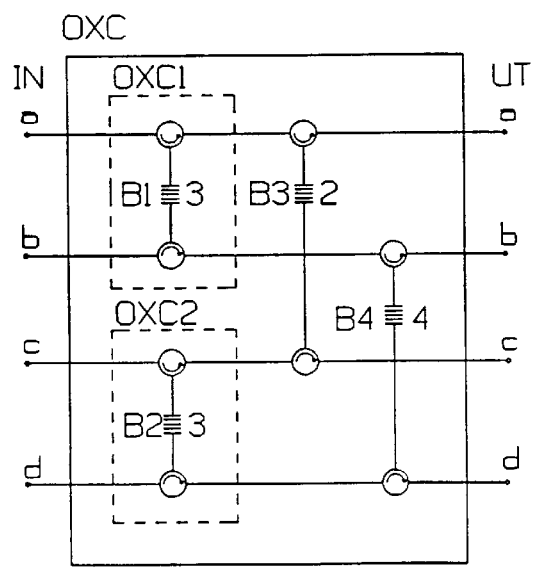
Fig 6a
Fig 6b

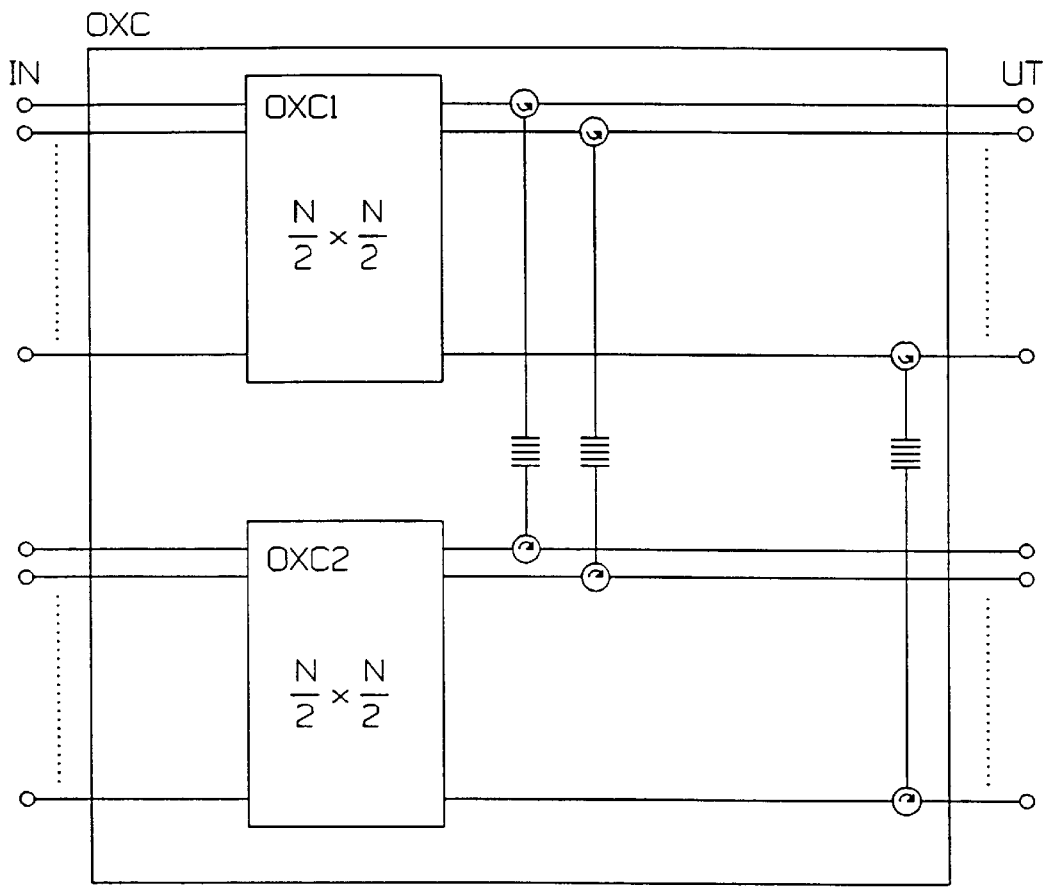
Fig 5
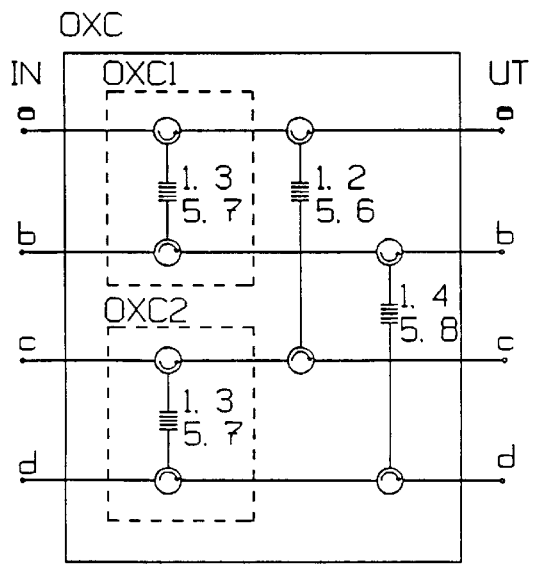
Fig 8a
| Tx\Rx | A | B | C | D |
|---|---|---|---|---|
| A | 1.5 | 2.6 | 3.7 | 4.8 |
| B | 4.8 | 1.5 | 2.6 | 3.7 |
| C | 3.7 | 4.8 | 1.5 | 2.6 |
| D | 2.6 | 3.7 | 4.8 | 1.5 |
Fig 8b

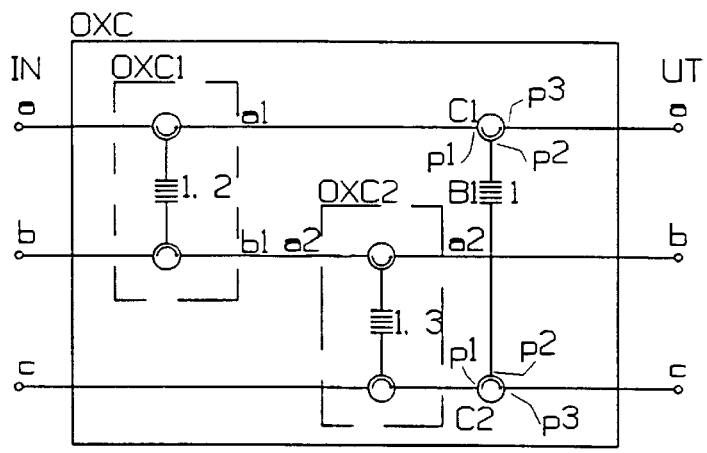
Fig 9a
Fig 9b
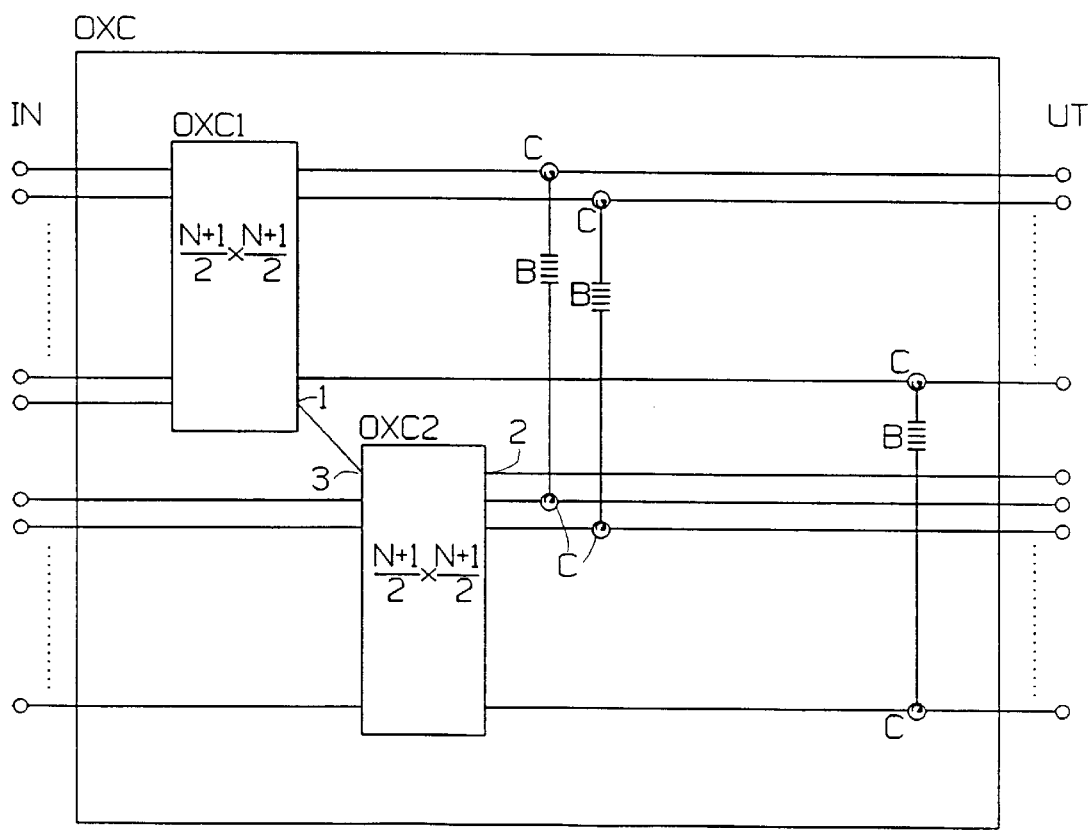
Fig 10

OPTICAL NXN WAVELENGTH CROSSCONNECT

TECHNICAL FIELD

The present invention relates to optical coupling systems and then particularly to a fibre optic WDM network (Wavelength Division Multiplexed networks). The invention relates more specifically to optical N×N wavelength cross-connectors which are used in coupling systems to connect different nodes in the system together, and a construction principle for such N×N wavelength cross-connectors, the designation N×N wavelength cross-connector referring to a wavelength cross-connector that has N inputs and N outputs.

DESCRIPTION OF THE BACKGROUND ART

U.S. Pat. No. 5,040,169 teaches an optical coupling system in which system nodes are connected to one another through the medium of an input interface, a central coupling device and an output interface. The data information transmitted between the nodes is modulated on different carrier waves or wavelength channels. The signals that are sent between the nodes will thus include a number of wavelength channels, for instance W1, W2, W3, W4, in accordance with one embodiment of the patent. The signals are fed to the inputs of the coupling device via the input interface, wherein the wavelength channels are switched, or in other words cross-connected, in the coupling device in accordance with a fixed cross-connection schedule. The cross-connection schedule discloses to which output a certain wavelength channel will be connected when said channel is fed-in on a certain input. Thus, correct selection of a wavelength channel in accordance with the cross-connection schedule will enable any two nodes in the system to be connected together.

According to the method described in the aforesaid patent specification, actual cross-connection is achieved by dividing the wavelength channels applied to an input of the coupling device into two branches in a first branch point, wherein half of the wavelength channels are connected to the first branch and the other half of said channels are connected to the second branch. This division of the wavelength channels is repeated in further branch points, until only one wavelength channel remains on each branch. The branches are disposed in "horizontal planes", one horizontal plane for each input of the coupling device. The wavelength channels are then re-combined in "vertical planes". Thus, two wavelength channels are joined together in a first combination point, and these two wavelength channels are joined to two other wavelength channels in a second combination point, and so on, until a signal is delivered from the coupling device. The number of wavelength channels in the output signal will then equal the number of wavelength channels in the input signal applied to the input of the coupling device. The coupling device operates in accordance with the principle of complete division of the wavelength channels of the input signals, whereafter the output signals are obtained by combining wavelength channels from all input signals.

The drawback with the known coupling device resides in its complex construction which requires a large number of components.

SUMMARY OF THE INVENTION

An object of the present invention is to solve the problem of how to construct an optical wavelength cross-connector which consists of passive components, which has a simple construction, which requires a minimum number of components, and which ill transmit signals between different nodes in an optical etwork with low transmission losses. Another object of the invention is to solve the problem of how two wavelength cross-connectors can be connected together to provide a wavelength cross-connector which has a larger number of inputs and outputs.

Thus, the object of the invention is to provide a wavelength cross-connector which solves the aforesaid problems. This object of the invention is realized by using two different components: an optical circulator device and an optical band reflex filter means. When connecting two circulator devices together through the medium of a band reflex filter device, there is obtained a cross-connection unit which is used to cross-connect the input signals fed into the wavelength cross-connector. The input signals include a plurality of wavelength channels and it is these channels that are cross-connected to different signal paths by the cross-connector in accordance with a fixed cross-connection schedule, so that output signals which include wavelength channels from the various input signals are delivered on the outputs of the wavelength cross-connector. The invention is based on the principle that certain wavelength channels are reflected by the band reflex filter devices and other wavelength channels are transmitted through the band reflex filter devices with low attenuation. Because of the modus operandi of the circulator devices and the manner in which they are connected to the band reflex filter device, it is possible to use a band reflex filter device symmetrically from both directions, therewith enabling wavelength channels to be cross-connected so that the number of wavelength channels will be held generally constant in all signal paths through the whole of the wavelength cross-connector, and so that the wavelength cross-connector can be constructed with only a few components.

When constructing a wavelength cross-connector having N inputs and N outputs, where N is an even integer, there are used two wavelength cross-connectors having N/2 inputs and N/2 outputs. Their inputs form the inputs of the N×N wavelength cross-connector. Their outputs are mutually connected in parallel, one output from each N/2×N/2 wavelength cross-connector, wherein each parallel coupling is achieved with the aid of two circulator devices and one band reflex filter device. One circulator device is connected to each output of the N/2×N/2 wavelength cross-connectors, wherein output ports of the circulator devices form the outputs of the N×N wavelength cross-connector.

When constructing a wavelength cross-connector that has N inputs and N outputs, where N is an odd integer, there are used two wavelength cross-connectors that have (N+1)/2 inputs and outputs. One output from the one (N+1)/2×(N+1)/2 wavelength cross-connector is connected to an input of the other (N+1)/2×(N+1)/2 wavelength cross-connector, there being obtained a series-connected output on the other (N+1)/2×(N+1)/2 wavelength cross-connector. Remaining outputs of the (N+1)/2×(N+1)/2 wavelength cross-connectors are mutually connected in parallel in the same way as for wavelength cross-connectors that have an even number of inputs and outputs, with the exception of the output that has been connected to the input and with the exception of the series-connected output. The inputs of the (N+1)/2×(N+1)/2 wavelength cross-connectors form the inputs of the N×N wavelength cross-connector, with the exception of the input that is connected to said output of the one (N+1)/2×(N+1)/2 wavelength cross-connector.

The inventive wavelength cross-connector thus has the advantages of being of simple construction and of requiring a minimum number of components that are passive and able to transmit signals between different nodes with low transmission losses. Another advantage afforded by the invention is that the construction is such as to enable the use of two small wavelength cross-connectors to obtain a wavelength cross-connector that has a larger number of inputs and outputs.

The invention will now be described in more detail with reference to exemplifying embodiments thereof and also with reference to the accompanying drawings.

BRIEF DESCRIPTION OF THE DRAWINGS

FIGS. 1a and 1b illustrate schematically the connection of four nodes in an optical WDM network together with the aid of a 4×4 wavelength cross-connector and a cross-connection schedule for the wave cross-connector.

FIGS. 2a and 2b illustrate respectively an optical 2×2 wavelength cross-connector in accordance with the invention and a cross-connection schedule for the wavelength cross-connector.

FIGS. 3a and 3b illustrate respectively an inventive 4×4 wavelength cross-conductor and a cross-connection schedule for said wavelength cross-connector.

FIG. 5 illustrates the general constructional principle of an inventive N×N wavelength cross-connector where N is an even integer.

FIGS. 6a and 6b illustrate respectively a modified 4×4 wavelength cross-connector and a cross-connection schedule for the modified wavelength cross-connector.

FIGS. 8a and 8b illustrate respectively a 4×4 wavelength cross-connector where input signals containing eight wavelength channels are used, and a cross-connection schedule therefor.

FIGS. 9a and 9b illustrate respectively a 3×3 wavelength cross-connector and a cross-connection schedule for said connector.

FIG. 10 illustrates the general constructional principle of an inventive N×N wavelength cross-connector where N is an odd integer.

BEST MODES OF CARRYING OUT THE INVENTION

Figure 4:
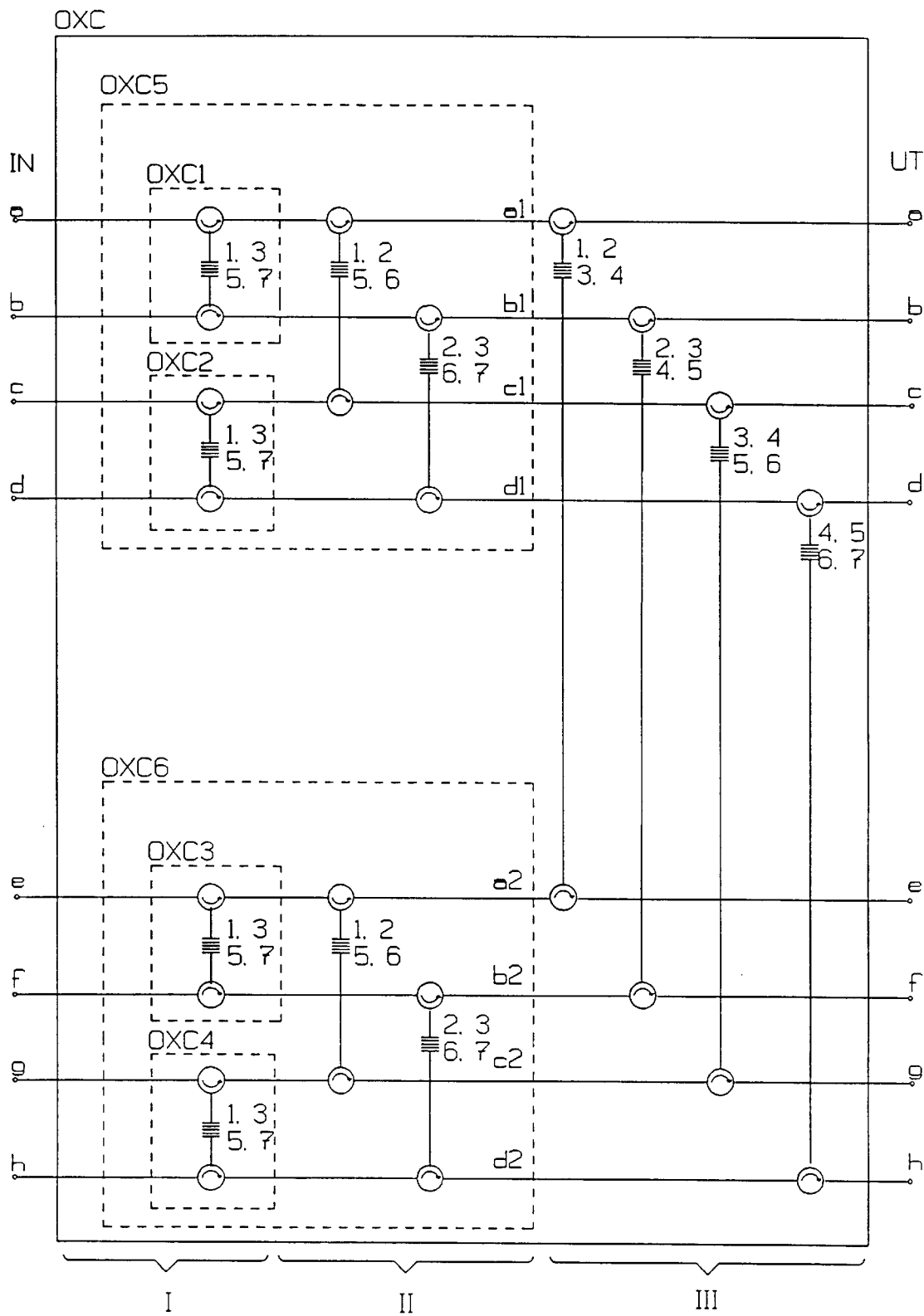
FIG. 4 illustrates schematically an 8×8 wavelength cross-connector constructed in accordance with the invention.

FIG. 1a illustrates an optical WDM network comprising four nodes A, B, C, D which communicate with one another through the medium of a 4×4 wavelength cross-connector OXC. Node A is connected to input a and also to output a of the wavelength cross-connector, node B is connected to input b and also to output b, and so on. The signals transmitted between the nodes via the 4×4 wavelength cross-connector include four different wavelength channels 1, 2, 3 and 4. The data information to be transmitted is modulated on these channels. Thus, a signal from node A is applied to input a, this signal consisting of the modulated wavelength channels 1a, 2a, 3a and 4a. The signals applied to the inputs b, c and d respectively include the same wavelength channels 1, 2, 3 and 4, although the wavelength channels are now modulated instead with data information from the nodes B, C and D respectively. The wavelength channels in the four input signals are redistributed in the wavelength cross-connector in accordance with a fixed cross-connection schedule, wherein output signals consisting of redistributed wavelength channels from the input signals are delivered on the outputs a, b, c and d. For instance, the output signal on output a comprises the wavelength length channels 1a, 2b, 3c and 4d, said output signal being formed by one wavelength channel from each input.

The cross-connection schedule shown in FIG. 1b is an example of how the wavelength channels can be cross-connected. The digits or numerals given in the schedule denote the wavelength channel that shall be used to connect a transmitting node Tx to a receiving node Rx. The wavelength channel 4 shall be used to transmit, for instance, from node A to node B, while wavelength channel 2 shall be used to transmit in the opposite direction. This enables any one node to be connected to any other node whatsoever. It is seen that if wavelength channel 1 is selected, the nodes are connected to themselves, which may in itself be desirable on certain occasions, although the wavelength channel can also be used in another way, as will be explained below.

According to the present invention, the wavelength cross-connector is constructed from two different types of components: optical circulator devices and optical band reflex filter devices.

The circulator devices may be optical circulators of the kind marketed by JDS FITEL for instance; see their Product Review 1993, page 11. The circulators have three ports, namely an input port, an intermediate port and an output port. A signal that is applied to the input port will be delivered from the intermediate port, and a signal that is applied to the intermediate port will be delivered from the output port. All other signal paths are blocked by the circulator. The same function can be obtained in other ways, for instance by using an arrangement consisting of an isolator and a 2×2 fibre connector, although this arrangement results in undesirable high signal attenuation, and consequently the aforementioned circulators are preferred.

The aforesaid band reflex filter devices are preferably optical fibre gratings of known kind. The wavelength characteristic of these fibre gratings is such that all wavelengths will be transmitted with low attenuation, with the exception of one wavelength band which is reflected with low attenuation. The band reflex filter devices include one or more series-connected fibre gratings in the inventive wavelength cross-connectors. The reflection band of the fibre gratings can reflect one wavelength channel, or more wavelength channels when fibre gratings having a broadband wavelength characteristic are used. This can be applied to minimize the number of components in a wavelength cross-connector, as described below. Interference filters are an example of other band reflex filter devices.

FIG. 2a shows how the cross-connection function is achieved in an inventive 2×2 wavelength cross-connector OXC. The cross-connector comprises two circulators C1, C2 and a band reflex filter device B1, which form a first (and sole) cross-connection stage I. In this case, the band reflex filter device is comprised of a fibre grating. The circulator input ports p1 form the inputs a and b of the wavelength cross-connector, and the circulator output ports p3 form the outputs a and b of said wavelength cross-connector. The intermediate ports p2 of the circulators are connected together via the band reflex filter device. In order to obtain the cross-connection schedule shown in FIG. 2b, the band reflex filter device shall reflect wavelength channel 1, which is marked with the digit 1 in the Figure adjacent the symbol for the band reflex filter device B1.

If the two input signals applied to the inputs a and b respectively include two modulated wavelength channels 1*a*, 2*a* and 1*b*, 2*b* respectively, the respective wavelength channels 1*a*, 2*b* and 1*b*, 2*a* will be delivered on the outputs a, b in accordance with the schedule shown in FIG. 2*b*. Cross-connection connection is achieved by feeding the wavelength channel 1*a* to the input port p1 of the circulator C1, feeding the wavelength channel from the intermediate port p2, reflecting said channel by the band reflex filter device B1, applying said channel to the intermediate port p2 of the circulator C1, and feeding-out the channel from the output port p3 which forms the output a of the wavelength cross-connector. The wavelength channel 2*a* is fed to the input port p1 of the circulator C1, fed out from the intermediate port p2, transmitted through the band reflex filter device B1, fed in to the intermediate port p2 of the circulator C2, fed out from the output port p3 which forms the output b of the wavelength cross-connector. The wavelength channels 1*b*, 2*b* are cross-connected to the outputs b and a respectively, in accordance with the same principle.

It should be noted that the band reflex filter device B1 is used symmetrically from both directions, in other words the same band reflex filter device is used to reflect wavelength channel 1 and to transmit wavelength channel 2 in the input signals delivered to inputs a and b.

The aforedescribed constructional principle can be applied to construct larger wavelength cross-connectors. Illustrated in FIG. 3*a* is a 4×4 wavelength cross-connector OXC which includes two 2×2 wavelength cross-connectors OXC1, OXC2 according to FIG. 2*a*. The wavelength cross-connectors OXC1, OXC2 are arranged parallel with one another and form the first cross-connection stage 1. The band reflex filter devices B1, B2 in FIG. 3*a* are intended to reflect two wavelength channels and may, for instance, comprise two series-connected fibre gratings which reflect wavelength channels 1 and 3. The inputs of the 2×2 wavelength cross-connectors OXC1, OXC2 together form the inputs of the 4×4 wavelength cross-connector. One output a1 of the one wavelength cross-connector OXC1 is connected to one output a2 of the other wavelength cross-connector OXC2, through the medium of two circulators C5, C6 and one band reflex filter device B3. In the case of this embodiment, the band reflex filter device B3 includes two series-connected fibre gratings which reflect the wavelength channels 1 and 2 respectively. The band reflex filter device B3 is connected to the intermediate ports of the circulators C5, C6 in the same manner as earlier described and is used symmetrically from both directions. The outputs b1 and b2 are connected together in the same way as the outputs a1 and a2, through the medium of two circulators C7, C8 and one band reflex filter device B4 which reflects the wavelength channels 1 and 4. A second cross-connection stage II is formed by the circulator pairs C5–C6 and C7–C8 and the band reflex filter devices B3, B4. The output ports of the circulator C5–C8 then form the outputs of the 4×4 wavelength cross-connector. FIG. 3*b* shows the cross-connection schedule for the 4×4 wavelength cross-connector.

FIG. 4 illustrates schematically the construction of an 8×8 wavelength cross-connector OXC. Two 4×4 wavelength cross-connectors OXC5, OXC6 are arranged parallel with one another, wherein the respective outputs a1–d1 and a2–d2 respectively of said connectors are connected to each other with two circulators and one band reflex filter device, therewith obtaining a third cross-connection stage III. The band reflex filter devices will preferably reflect half of the wavelength channels that form, the input signals to the inputs a–h. If it is assumed that the input signals contain the same number of wavelength channels as there are inputs, four wavelength channels shall be reflected, as illustrated in the Figure. The two 4×4 wavelength cross-connectors OXC5, OXC6 may be constructed in the manner described with reference to FIG. 3*a*, but need not be so constructed. Thus, other types of wavelength cross-connectors can be used to realize the two 4×4 wavelength cross-connectors if so desired.

FIG. 5 illustrates the general construction principle of an N×N wavelength cross-connector OXC, where N is an even integer. Two N/2×N/2 wavelength cross-connectors OXC1, OXC2 are mutually connected in parallel, the outputs of said connectors being connected together through the medium of two circulators and one band reflex filter device. When the entire wavelength cross-connector is constructed in accordance with the inventive principle, the band reflex filter devices will preferably reflect half of the wavelength channels in the signals applied to the inputs of the N×N wavelength cross-connector and transmit remaining wavelength channels.

As described above, the nodes will be connected to themselves for one of the wavelength channels used. Thus, it will be seen from FIGS. 3*a*–3*b* that the wavelength channel 1 does not contribute to the communication between the nodes. According to the cross-connection schedule shown in FIG. 3*b*, the wavelength channel 1 can instead be used for fibre monitoring purposes, for instance. By modifying the wavelength cross-connector in FIG. 3*a* in the manner shown in FIG. 6*a*, this wavelength channel 1 can instead be used to double the communication capacity between certain nodes. In the case of the wavelength cross-connector OXC illustrated in FIG. 6*a*, the wavelength channel 1 is not reflected in any of the band reflex filter devices B1–B4, thereby obtaining a cross-connection schedule according to FIG. 6*b*. It will be seen from FIG. 6*b* that either wavelength channel 1 or wavelength channel 2 can be used to transmit from node A to node D and that the wavelength channel 1 or wavelength channel 4 can be used to transmit from node B to node C, and so on. However, this doubling of the communication capacity between certain nodes results in the loss of the ability to transmit from one node to itself.

Figure 7:
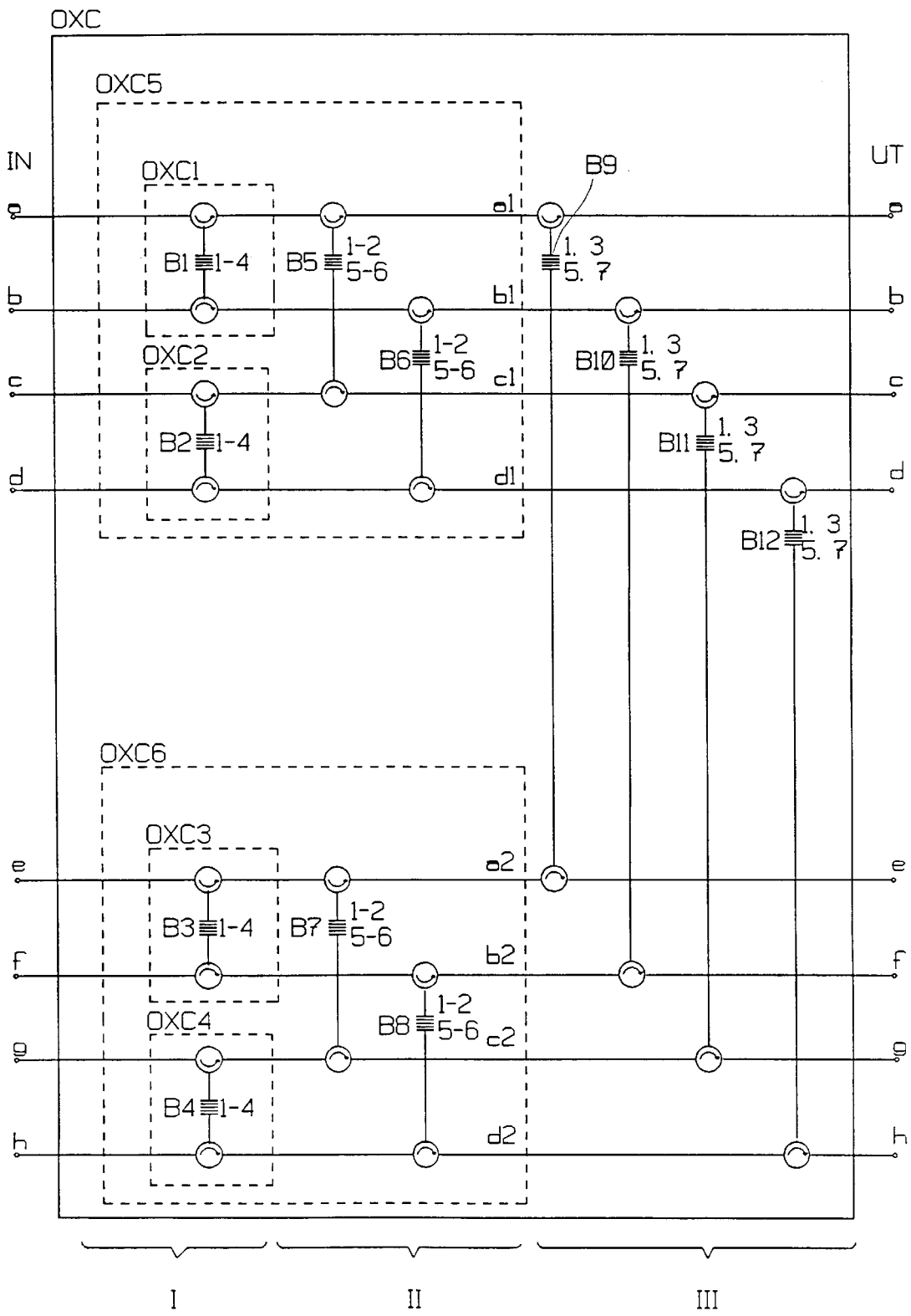
FIG. 7 illustrates an 8×8 wavelength cross-connector in which a broadband band reflex filter device is used.

The number of components required to construct a wavelength cross-connector can be minimized by grouping together wavelength channels that lie adjacent each other in the wavelength spectrum and using band reflex filter devices that have a broadband characteristic. Thus, a broadband fibre grating can be used to reflect four mutually adjacent wavelength channels, this replacing four fibre gratings which each reflect a respective wavelength channel. In this case, it would be possible to modify the 8×8 wavelength cross-connector in FIG. 1 in accordance with FIG. 7. In the first cross-connection stage I, the four mutually adjacent wavelength channels 1–4 are reflected by a band reflex filter device B1–B4 which includes a broadband fibre grating. In the second cross-connection stage II, the number of wavelength channels that lie adjacent one another has been halved, and consequently it is necessary to use two series-connected broadband fibre gratings which form the band reflex filter devices B5–B8 that reflect respective wavelength channels 1–2 and 5–6. Finally, it is necessary to use in the third and last cross-connection stage III four series-connected fibre gratings which form the band reflex filter devices B9–B12, each of said fibre gratings reflecting one wavelength channel. It is thus possible in this way to minimize the number of fibre gratings that are needed to provide the cross-connection function. The number of band reflex filters $g_s(N)$ required to construct a wavelength cross-connector having N inputs can be calculated with the aid of equation (1) below. Equation (2) gives the number of band reflex filters $g_o(N)$ when using broadband reflex filters. Equation (3) gives the number of circulators $c(N)$ required to construct a wavelength cross-connector having N inputs. Equation (4) gives the number of cross-connection stages $x(N)$ in a wavelength cross-connector having N inputs.

$$g_s(N) = 4 \cdot gN_s(N/2) + N^2/4 \quad \text{where} \quad g_s(2) = 1 \quad equ. \ (1)$$

$$g_o(N) = 2 \cdot go(N/2) + N^2/4 \quad \text{where} \quad g_o(2) = 1 \quad equ. \ (2)$$

$$c(N) = 2 \cdot c(N/2) + N \quad \text{where} \quad c(2) = 2 \quad equ. \ (3)$$

$$x(N) = \ln N / \ln 2 \quad equ. \ (4)$$

The equations (1)–(4) apply to wavelength cross-connectors where $N=2^x x=1, 2, 3, \ldots$ The construction described above exhibits a high degree of symmetry and consequently the number of expensive components, i.e. the circulators, will only increase linearly when the capacity of the wavelength cross-connector is squared. It is most preferred that the number of inputs $N=2^x$, $x=1, 2, 3, \ldots$ and the number of wavelength channels in each input signal is equal to the number of inputs. An inventive wavelength cross-connector will then be able to connect each node to all nodes in the network. However, it is fully possible to use, for instance, twice as many wavelength channels in each input signal as the number of inputs, wherein twice as many wavelength channels will be reflected with each band reflex filter device. This doubles the communication capacity, because two wavelength channels can be selected for connecting one node to another node. This is illustrated in FIGS. 8a–8b with a 4×4 wavelength cross-connector OXC; compare this Figure with FIGS. 3a–3b.

It is also possible to construct a wavelength cross-connector with an odd number of inputs and outputs, as explained below. FIGS. 9a and 9b show respectively a 3×3 wavelength cross-connector OXC and a cross-connection schedule therefor. The 3×3 wavelength cross-connector is constructed of two 2×2 wavelength cross-connectors OXC1, OXC2 which are mutually connected "parallel in series". This means that one output b1 from the one 2×2 wavelength cross-connector OXC1 is connected in series to an input a2 of the other 2×2 wavelength cross-connector OXC2, therewith obtaining a series-connected output a2 on the other 2×2 wavelength cross-connector OXC2. The three remaining inputs of the 2×2 wavelength cross-connectors together form the inputs of the 3×3 wavelength cross-connector. As described above, a circulator device C1, C2 is then connected to the outputs of the 2×2 wavelength cross-connectors OXC1, OXC2, except for two of the outputs. These two outputs are comprised partly of the output B1 connected to the input a2 of the 2×2 wavelength cross-connector OXC2 and partly of said series-connected output a2 of the second 2×2 wavelength cross-connector OXC2, said output a2 forming an output on the 3×3 wavelength cross-connector. This results in an even number of outputs from the 2×2 wavelength cross-connectors (two outputs in the case of a 3×3 wavelength cross-connector) which can be connected pair-wise to one another via the circulator devices C1, C2 and a band reflex filter device B1. The band reflex filter device B1 is connected to the intermediate ports of the circulator devices in the same way as that earlier described, and the output ports of the circulator devices form the outputs of the 3×3 wavelength cross-connector, except for one output which is formed by the series-connected output a2 as explained above. FIG. 9b illustrates the cross-connection schedule obtained for the wavelength cross-connector shown in FIG. 9a.

FIG. 10 illustrates the general construction of an N×N wavelength cross-connector OXC where N is an odd number. Two (N+1)/2×(N+1)/2 wavelength cross-connectors OXC1, OXC2 are parallel-connected in series with one another, and the outputs of said connectors are connected to a circulator device C with the exception of two outputs 1, 2. The circulator devices are connected together pair-wise, one from each (N+1)/2×(N+1)/2 wavelength cross-connector, via a band reflex filter device B. The inputs of the N×N wavelength cross-connector OXC are formed by the inputs of the (N+1)/2×(N+1)/2 wavelength cross-connectors, with the exception of one input 3, which is connected to the output 1 of the wavelength cross-connector OXC1. The outputs of the N×N wavelength cross-connector are formed by the output ports of the circulator devices, with the exception of one output, which is formed by the output 2 of the wavelength cross-connector OXC2.

It will be understood that the invention is not restricted to the aforedescribed and illustrated exemplifying embodiments thereof and that modifications can be made within the scope of the following claims.

I claim:

1. An optical 2×2 wavelength cross-connector comprising:
   two inputs for each receiving input signals transmitted via a number of different wavelength channels;
   two outputs for each outputting output signals;
   two optical circulator devices each having an input port that define the two inputs of the 2×2 wavelength cross-connector, an intermediate port, and an output port that define the two outputs of the 2×2 wavelength cross-connector; and
   a band reflex filter device connected to the intermediate ports of the two circulator devices;
      the input ports (p1) of the circulator devices form the inputs of the 2×2 wavelength cross-connector;
      the output ports (p3) of the circulator devices form the outputs of the 2×2 wavelength cross-connector;
      the band reflex filter device for reflecting certain wavelength channels of the different wavelength channels and transmitting other wavelength channels of said different wavelength channels.

2. An optical N×N wavelength cross-connector according to claim 1, wherein the number of wavelength channels is equal to the number of inputs.

3. An optical N×N wavelength cross-connector according to claim 1, wherein the band reflex filter device reflects half of the different wavelength channels.

4. An optical N×N wavelength cross-connector according to claim 1, wherein the band reflex filter device includes an optical fibre grating.

5. An optical N33 N wavelength cross-connector according to claim 4, wherein the fibre grating includes a broadband fibre grating for reflecting several wavelength channels.

6. An optical 3×3 wavelength cross-connector comprising:
   three inputs to the 3×3 wavelength cross-connector for each receiving input signals transmitted via a number of different wavelength channels;
   three outputs from the 3×3 wavelength cross-connector for each outputting output signals;
   a first wavelength cross-connector and a second wavelength cross-connector each having a first input and a second input and a first output and a second output, said first output of said first wavelength cross-connector being connected in series with said second input of said second wavelength cross-connector, wavelength cross-connector (OXC2), thereby obtaining a series-connected output (a2);

said first input of said second wavelength cross-connector and said first and second inputs of said first wavelength cross-connector defining the three inputs of the 3×3 wavelength cross-connector;

a first optical circulator device and second optical circulator device each having an input port, an intermediate port, and an output port, said input port of said first optical circulator device connected to said second output of said first wavelength cross-connector, said input port of said second optical circulator device connected to said first output of said second optical circulator device, said second output of said second wavelength cross-connector and said output ports of said first and second optical circulator devices defining said three outputs of the 3×3 wavelength cross-connector; and a band reflex filter device connected to the intermediate ports of the first and second circulator devices;

the band reflex filter device for reflecting certain wavelength channels of the different wavelength channels and transmitting other wavelength channels of said different wavelength channels.

7. An optical N×N wavelength cross-connector comprising:

N inputs for each receiving input signals transmitted via a number of different wavelength channels;

N outputs for each outputting output signals, N being an even integer; two $$\frac{N}{2} \times \frac{N}{2}$$

wavelength cross-connectors arranged parallel with one another and each having N/2 inputs and N/2 outputs, the N/2 inputs of the two $$\frac{N}{2} \times \frac{N}{2}$$

wavelength cross-connectors defining the N inputs of the N×N wavelength cross-connector;

N optical circulator devices each having an input port, an intermediate port, and an output port, each input port of each of the N optical circulator devices being connected to one of the N/2 outputs of each of the $$\frac{N}{2} \times \frac{N}{2}$$

wavelength cross-connectors, the output ports of the N optical circulator devices defining the N outputs of the N×N wavelength cross-connector; and N/2 band reflex filter devices that each connect the intermediate ports of a pair of the N optical circulator devices, each of the N/2 band reflex filter devices for reflecting certain wavelength channels of the different wavelength channels and transmitting other wavelength channels of said different wavelength channels.

8. An optical N×N wavelength cross-connector comprising:

N inputs for each receiving input signals transmitted via a number of different wavelength channels;

N outputs for each outputting output signals, N being an odd integer;

two $$\frac{(N+1)}{2} \times \frac{(N+1)}{2}$$

wavelength cross-connectors each having (N+1)/2 inputs and (N+1)/2 outputs, one of the (N+1)/2 outputs from one of the $$\frac{(N+1)}{2} \times \frac{(N+1)}{2}$$

wavelength cross-connectors being connected in series with one of the (N+1)/2 inputs of another of the $$\frac{(N+1)}{2} \times \frac{(N+1)}{2}$$

wavelength cross-connectors, the remaining inputs of the (N+1)/2 inputs of the (N+1)/2 wavelength cross-connectors together defining the N inputs of the N×N wavelength cross-connector; <a plurality of optical circulator devices each having an input port, an intermediate port, and an output port, each input port of each of the optical circulator devices being connected to one of the (N+1)/2 outputs of each of the $$\frac{(N+1)}{2} \times \frac{(N+1)}{2}$$

wavelength cross-connectors with the exception of said one (N+1)/2 output from said one $$\frac{(N+1)}{2} \times \frac{(N+1)}{2}$$

wavelength cross-connector that is connected in series with said one (N+1)/2 input of said another $$\frac{(N+1)}{2} \times \frac{(N+1)}{2}$$

wavelength cross-connector, and with the exception of one of said (N+1)/2 outputs from said another $$\frac{(N+1)}{2} \times \frac{(N+1)}{2}$$

wavelength cross-connector, the output ports of the optical circulators and said one output from said another $$\frac{(N+1)}{2} \times \frac{(N+1)}{2}$$

wavelength connector defining the N outputs of the N×N wavelength cross-connector; and a plurality of band reflex filter devices that each connect the intermediate ports of a pair of the optical circulator devices, each of the band reflex filter devices for reflecting certain wavelength channels of the different wavelength channels and transmitting other wavelength channels of said different wavelength channels.

9. An optical N×N wavelength cross-connector according to claim 8, wherein all of said band reflex filter devices transmit one and the same wavelength channel.

10. An optical N×N wavelength cross-connector comprising:

a plurality of band reflex filter devices;

N inputs and N outputs, where $N=2^x$ and X is an integer, the N inputs for receiving input signals transmitted via a number of different wavelength channels, the N outputs for outputting output signals;

a plurality of optical circulator devices that each have an input port, an intermediate port, and an output port, wherein the intermediate ports of pairs of the optical circulator devices are connected together with one of the reflex filter devices to form at least a first cross-connection stage, a second cross-connection stage, and a third cross-connection stage, the input ports of a first pair of optical circulator devices in the first cross-connection stage being connected to at least one of the inputs of the N×N wavelength cross-connector, the output ports of the first pair of optical circulator devices being connected to at least one of the input ports of a second pair of optical circulator devices in the second cross-connection stage;

the input ports and output ports of the circulator devices in the third cross-connection stage being connected to at least one of the output ports of the circulator devices in the second cross-connection stage and to at least one of the N outputs of the N×N wavelength cross-connector;

wherein the band reflex filter device reflects certain wavelength channels of the different wavelength channels and transmits other wavelength channels of said different wavelength channels.

11. An optical wavelength cross-connector comprising:

a plurality of optical circulator devices each having an input port, an intermediate port, and an output port for each transmitting signals via a plurality of wavelength channels; and a band reflex filter device for reflecting certain wavelength channels of said plurality of wavelength channels and for transmitting other wavelength channels of said plurality of wavelength channels, said band reflex filter device connected to the intermediate ports of a pair of said optical circulator devices.

12. The optical wavelength cross-connector according to claim 11, further comprising N inputs to the wavelength cross-connector and N outputs from the wavelength cross-connector, N being an even integer.

13. The optical wavelength cross-connector according to claim 11, further comprising N inputs to the wavelength cross-connector and N outputs from the wavelength cross-connector, N being an odd integer.

14. The optical wavelength cross-connector according to claim 11, wherein the band reflex filter device reflects half of the plurality of wavelength channels.

15. The optical wavelength cross-connector according to claim 11, further comprising another band reflex filter device connected to the intermediate ports of another pair of said optical circulator devices.

16. The optical wavelength cross-connector according to claim 15 wherein all of said band reflex filter devices transmit one and the same wavelength channel.

17. The optical wavelength cross-connector according to claim 15, further comprising a further band reflex filter device connected to the intermediate ports of a further pair of said optical circulator devices.

18. The optical wavelength cross-connector according to claim 11, wherein said plurality of optical circulator devices includes a first optical circulator device and a second optical circulator device, the first optical circulator device having at least one output that is connected to at least one input of the second optical circulator device.

19. The optical wavelength cross-connector according to claim 11, wherein said optical wavelength cross-connector is a first optical wavelength cross-connector having a plurality of inputs and outputs, further comprising a second optical wavelength cross-connector having a plurality of inputs and outputs, one of said outputs of said first wavelength cross-connector being connected in series with one of said inputs of said second wavelength cross-connector.

20. The optical wavelength cross-connector according to claim 19, wherein another of said output ports of said second optical circulator device is connected to an input port of one of said optical circulator devices.

21. The optical wavelength cross-connector according to claim 11, further comprising N inputs to the wavelength cross-connector, the number of said wavelength channels being equal to N.

22. The optical wavelength cross-connector according to claim 11, wherein the band reflex filter device reflects at least half of the wavelength channels.

23. The optical wavelength cross-connector according to claim 11 wherein the band reflex filter device includes an optical fibre grating.

24. The optical wavelength cross-connector according to claim 23, wherein the fibre grating includes a broadband fibre grating for reflecting several wavelength channels.

* * * * *